US012788034B2

(12) United States Patent
Slen et al.

(10) Patent No.: US 12,788,034 B2
(45) Date of Patent: Nov. 10, 2026

(54) MODULAR AND CONFIGURABLE POWERED FAN FOOD DRYING APPARATUS AND METHOD

(71) Applicants: Philip Lien Slen, Calgary (CA); Rodney James Frans, Kanata (CA)

(72) Inventors: Philip Lien Slen, Calgary (CA); Rodney James Frans, Kanata (CA)

( * ) Notice: Subject to any disclaimer, the term of this patent is extended or adjusted under 35 U.S.C. 154(b) by 448 days.

(21) Appl. No.: 18/436,018

(22) Filed: Feb. 8, 2024

(65) Prior Publication Data

US 2025/0255326 A1 Aug. 14, 2025

(51) Int. Cl.
*A23L 5/30* (2016.01)
*F26B 9/00* (2006.01)
*F26B 21/50* (2026.01)

(52) U.S. Cl.
CPC ................ *A23L 5/30* (2016.08); *F26B 9/003* (2013.01); *F26B 21/50* (2026.01)

(58) Field of Classification Search
CPC .. F26B 9/003; F26B 21/50; F26B 3/04; F26B 9/066; A23L 5/30
See application file for complete search history.

(56) References Cited

U.S. PATENT DOCUMENTS 5,369,892 A * 12/1994 Dhaemers ............... D06F 58/10
34/224
2026/0110485 A1* 4/2026 Slenders ................... F26B 5/06

FOREIGN PATENT DOCUMENTS

CA 3163165 A1 * 7/2021
JP 2018042491 A * 3/2018

OTHER PUBLICATIONS

Translation JP-2018042491-A (Year: 2018).*

* cited by examiner

*Primary Examiner* — Jessica Yuen
(74) *Attorney, Agent, or Firm* — Novel Patent Services LLC

(57) ABSTRACT

A modular and configurable powered-fan food drying apparatus with modular front, back and side panels, and modular top and bottom panel. The side panels have multiple levels of ledge support to accommodate multiple configurable food drying position racks. Top and bottom panels have lateral parallel directional air flow channels to direct air flow through the apparatus from back to front. Front panel houses a battery powered-fan that draws air in through the back panel air deflectors into the apparatus cavity and expels air out of apparatus through the front panel powered-fan. The air flows all around the positioned racked food items as it moves in one direction, from back to front and out of the apparatus. The continuous air flowing all around food items speeds up the food surface area drying time.

10 Claims, 9 Drawing Sheets

200

230

300

350

550

600

610

MODULAR AND CONFIGURABLE POWERED FAN FOOD DRYING APPARATUS AND METHOD

BACKGROUND

Drying food items such as raw meats' skin and surfaces like poultry, pork, beef or other meats prior to roasting or grilling helps to create a browner and crispier skin of the meat when cooked. A dryer meat skin creates a better Maillard reaction, which is the browning and crispying of the meat skin during the cooking process. This powered-fan food drying apparatus and method invention helps to remove moisture from the meat food items' skin and surface and not their interiors. The meat under the skin remains moist prior to cooking and should remain moist and tender when cooked properly. Hence the food mantra of crispy on the outside and moist and tender on the inside is the ultimate goal of generally roasted and grilled meat.

Food items' skin and surface drying is not the same as food items' dehydration. Food dehydration is a process of removing most or all moisture from food items' exterior and interior to extend shelf life and prevent spoilage. Dehydrated meat's interior will not result in the optimal "moist and tender on the inside" when cooked.

The conventional approach to drying various raw meat food items' skin and surfaces in the typical home refrigerator is to place the raw meat on a rack and tray uncovered. In some instances, the raw meat could be hung in a refrigerator if space is available. Typical home refrigerators do not have effective air flow. The food items to dry would take a long time, typically overnight at the minimum.

This conventional approach has disadvantages. First and foremost is the potential for cross contamination from raw meat food items coming into contact with other food items in the refrigerator. This would pose a significant food safety and health risk. Second is limited refrigerator space being occupied by the raw meat food items, for a period of time, which must be kept away from other food items at a reasonable distant to prevent accidental contact. Lastly, exposed raw meat food items in a home refrigerator presents an unappetizing and unsightly scene of raw meat and blood drippings.

The present invention is the solution to address the above listed disadvantages. An enclosed, small sized, powered-fan air box to hold the raw meat food items, and one that fits inside a typical home refrigerator. The air box has multiple level support racks for various types of meat food items' skin drying. The fan draws continuous air flow from one end into the air box and expelling air out the other end of the air box.

DETAILED DESCRIPTION OF EMBODIMENTS

Figure 1A:
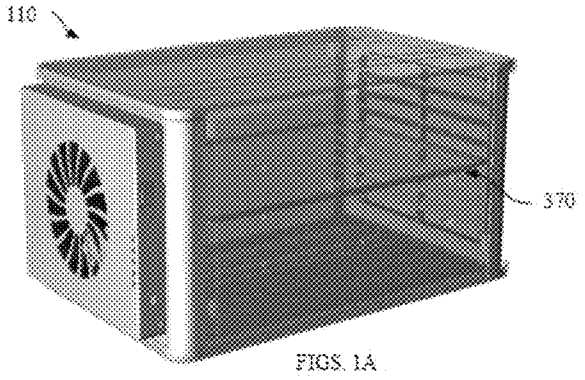
FIGS. 1A and 1B are the perspective views of an embodiment of the modular and configurable powered-fan food drying apparatus of the invention configured with one food drying rack and two food drying racks frame members as illustrated in FIGS. 3E, engaged respectively.
Figure 1B:
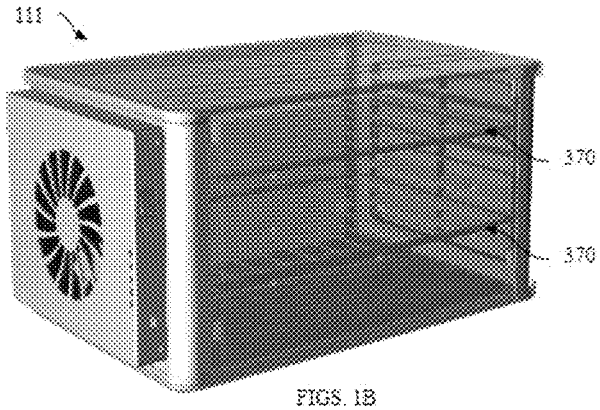
Figure 1C:
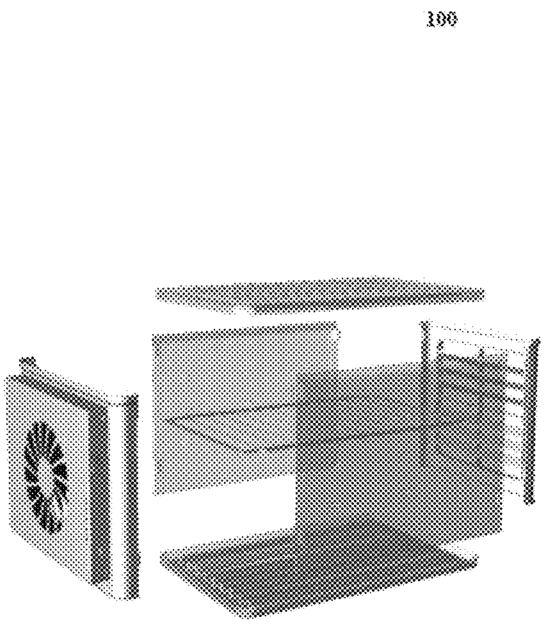
FIG. 1C is the exploded perspective view of FIG. 1A.

The modular and configurable powered-fan food drying apparatus invention is illustrated in general at 100 in FIGS. 1A and 1B. FIG. 1A illustrates an embodiment of the invention of the modular and configurable powered-fan food drying apparatus 110 illustrated with one configurable food drying rack grill frame member 370. Whereas FIG. 1B illustrates an alternative configuration of an embodiment of the invention of the powered-fan food drying apparatus 111 illustrated with two configurable food drying rack grill frame member 370. FIG. 1C is the exploded view of FIG. 1A.

Figure 2A:
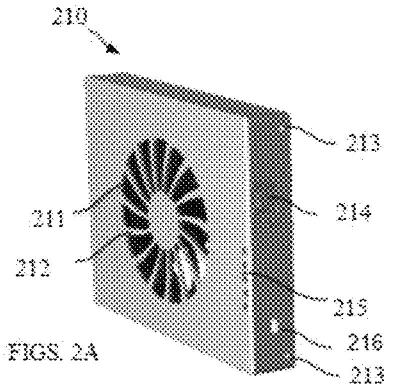
FIG. 2A is the front perspective view of an embodiment of the powered-fan housing-cover frame member.

The modular components frame members of an embodiment of the invention as illustrated in FIGS. 1A and 1B are described in greater details below. At 200 in FIG. 2A is an embodiment of a powered-fan housing-cover frame member 210 which houses the powered-fan 211 behind the housing-cover grill 212. There are two screw fastener slots 213 on each vertical side wall, a power on-off switch 214, battery power level indicator LED lights 215 and a battery power charge port 216.

Figure 2B:
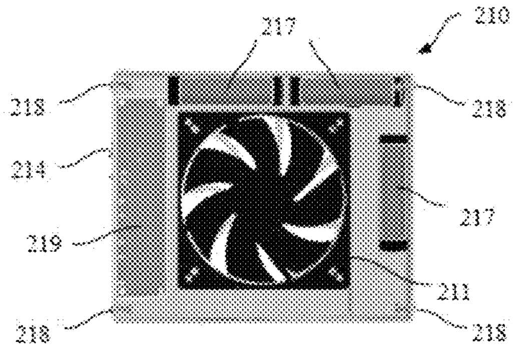
FIG. 2B is the rear elevation view of FIG. 2A illustrating the assembly of the powered-fan and electronics components.

FIG. 2B illustrates the back side of the powered-fan housing-cover frame member 210. An embodiment of the electronics assembly illustrates the batteries 217, the two screw fasteners 218 on each vertical side wall that would protrude through the screw fastener slots 213, and the PCB electronics control board 219.

Figure 2C:
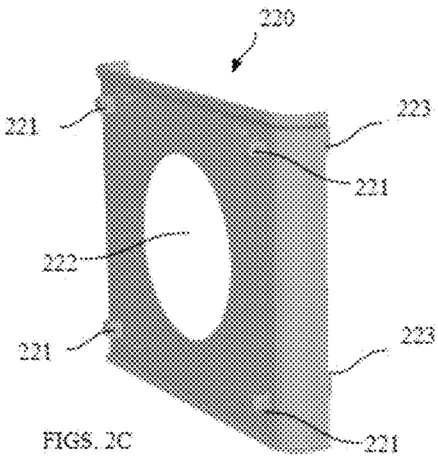
FIG. 2C is the front perspective view of the food drying apparatus modular front wall panel frame member.
Figure 2D:
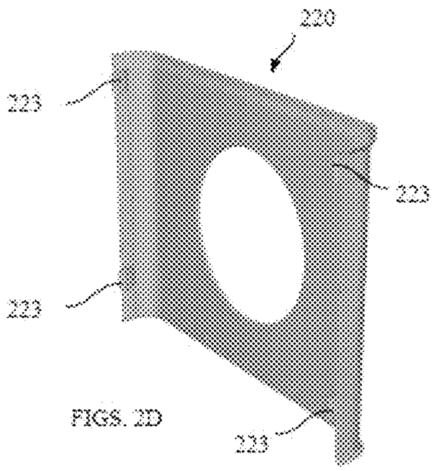
FIG. 2D is the rear perspective view of FIG. 2C.

FIG. 2C illustrates the modular and configurable powered-fan food drying apparatus' modular front wall panel frame member 220. There are four screw fastener anchors 221 matching the location and position of each of the screw fasteners 218 on the powered-fan housing-cover frame member 210. The center circumference powered-fan slot opening 222 and modular front wall panel male connector couplings 223 on each vertical side wall. FIG. 2D illustrates the back side of FIG. 2C.

Figure 2E:
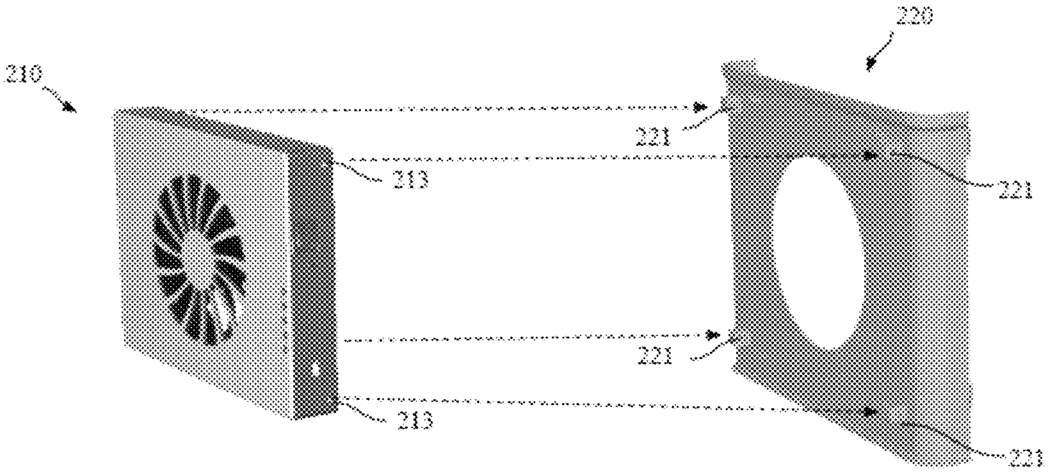
FIG. 2E is the front perspective view of assembly of FIG. 2A onto FIG. 2C.

At 230 in FIG. 2E illustrates the assembly of the powered-fan housing-cover frame member 210 onto the modular front wall panel frame member 220 where each screw fastener slot 213 and the screw fasteners 218, as illustrated in FIGS. 2B, is positioned and fastened to each screw fastener anchor 221 respectively.

Figure 3A:
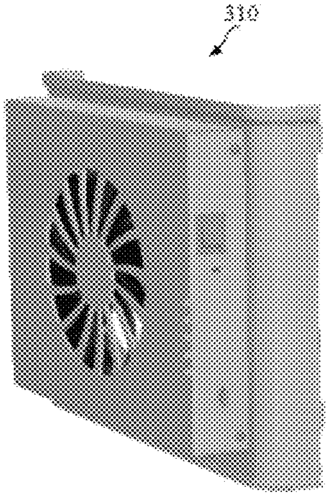
FIG. 3A is the front perspective view of an embodiment of the food drying apparatus modular front panel frame member FIG. 2C assembled with the powered-fan housing-cover frame member FIG. 2A.
Figure 3B:
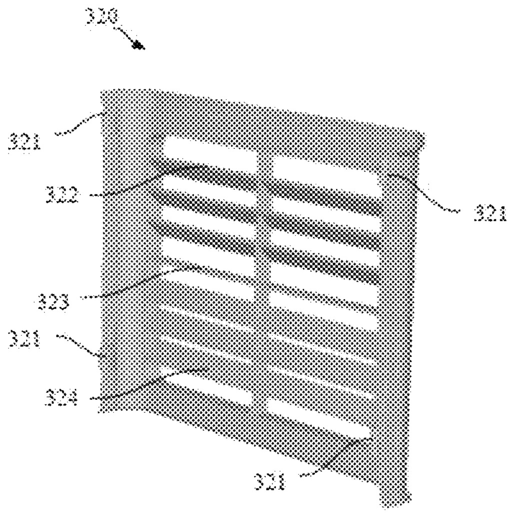
FIG. 3B is the rear perspective view of an embodiment of the food drying apparatus modular back wall panel frame member.

The result of the assembly in FIG. 2E is illustrated at 300 in FIG. 3A; an embodiment of an assembled powered-fan modular front wall panel frame member 310. FIG. 3B illustrates the modular and configurable powered-fan food drying apparatus' modular back wall panel frame member 320 which has two male connector couplings 321 on each vertical side wall. The back wall is comprised of upward tilt deflector slats 322, flat deflector slat 323, and downward tilt deflector slats 324.

Figure 3C:
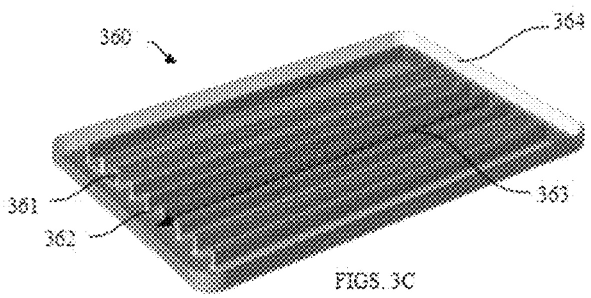
FIG. 3C is the perspective view of an embodiment of the food drying apparatus modular bottom base panel frame member.
Figure 3D:
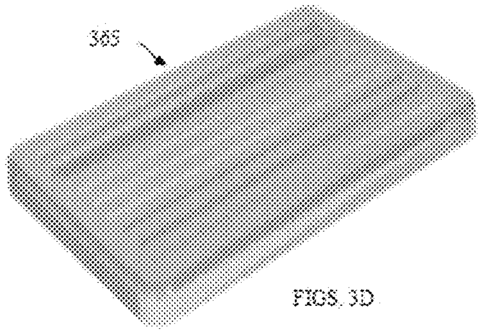
FIG. 3D is the upside down perspective view of FIG. 3C.

The remaining modular components frame members of an embodiment of the invention of the modular and configurable powered-fan food drying apparatus are at 350 in FIGS. 3C, 3D, 3E and 3F. FIG. 3C illustrates an embodiment of the modular bottom base panel frame member 360. Evenly spaced lateral parallel air flow channel walls frame members 361 rise above the bottom base panel floor 362, to direct air flow movement as illustrated by directional channelled air flow 363. The modular bottom base panel's outer wall 364 completes the structural integrity of this embodiment. FIG. 3D illustrates the modular bottom base panel frame member 360 in FIG. 3C flipped in an upside-down position to function as a modular top cover panel frame member 365.

Figure 3E:
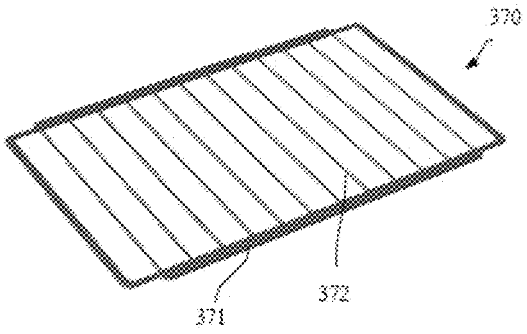
FIG. 3E is the perspective view of an embodiment of the configurable food drying rack grill frame member.
Figure 3F:
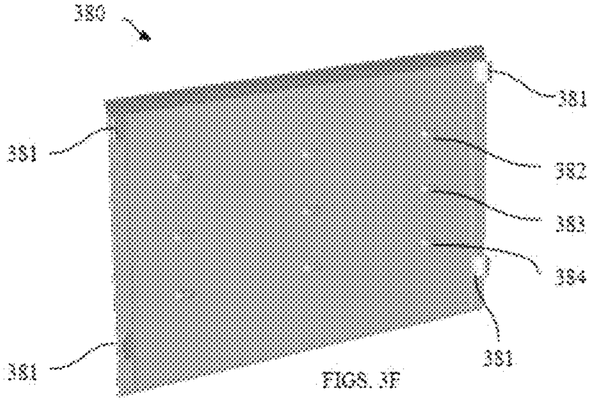
FIG. 3F is the perspective view of an embodiment of the food drying apparatus modular side wall panel frame member.
Figure 3G:
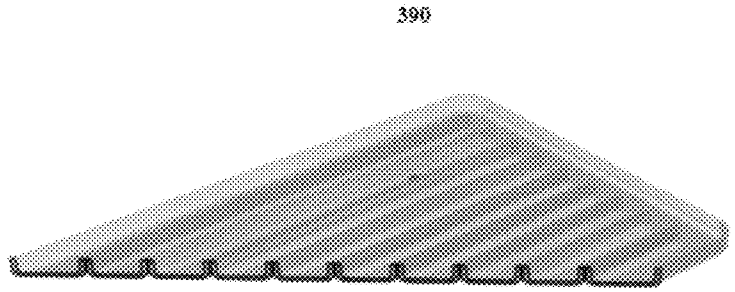
FIG. 3G is the diagonal cut out section perspective view of FIG. 3C.

FIG. 3E illustrates an embodiment of a configurable food drying rack grill frame member 370. Reinforced wide side edge 371 supports cross grill frame members 372. FIG. 3F illustrates an embodiment of the modular and configurable powered-fan food drying apparatus' modular side wall panel frame member 380. There are two side wall panel female connector couplings 381 at each end of the wall panel frame member. Inaddition, there are three levels of side wall ledge support 382, 383 and 384 respectively, for the configurable food drying rack grill frame member 370 to position thereon. At 390 in FIG. 3G is a diagonal cross cut-out section perspective view of FIG. 3C.

Figure 4A:
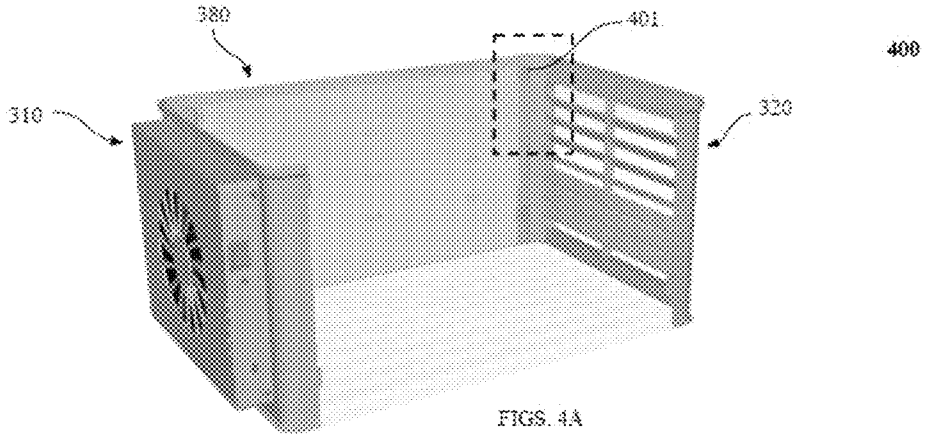
FIG. 4A is the perspective view of the assembly of the modular front wall panel frame member FIG. 3A and the modular back wall panel frame member FIG. 3B where each is connected to the modular side wall panel frame member FIGS. 3F, respectively.
Figure 4B:
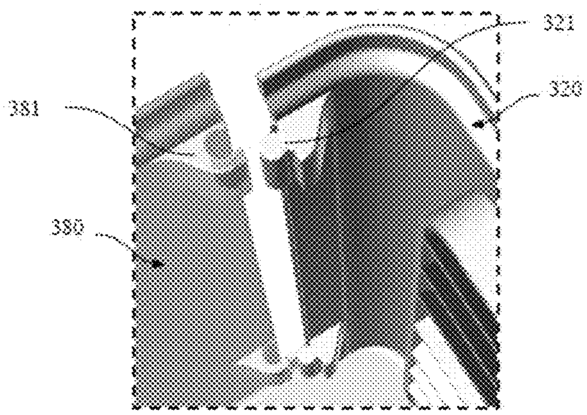
FIG. 4B is the enlarged perspective view of FIG. 4A illustrating the prior connection of the modular back wall panel frame member FIG. 3B being connected to the modular side wall panel frame member FIG. 3F.
Figure 4C:
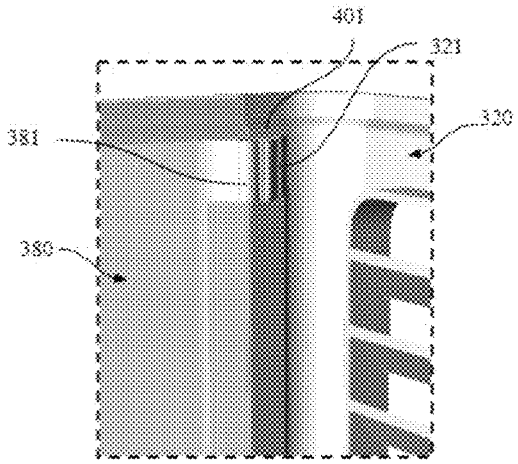
FIG. 4C is the enlarged perspective view of FIG. 4A illustrating the modular back wall panel frame member FIG. 3B connected to the modular side wall panel frame member FIG. 3F.

The modularity of all the components frame members of the modular and configurable powered-fan food drying apparatus allows for ease of assembly and disassembly by the end user as illustrated at 400 in FIGS. 4A, 4B, and 4C. FIG. 4A illustrates the partially assembled modular frame members 310, 320 and 380. The aforementioned ease of assembly is made simple by the panel-to-panel connector couplings 401 of two frame members together. FIGS. 4B and 4C illustrates this invention's modularity in greater details. FIG. 4B illustrates an enlarge view of the modular side wall panel frame member 380 and its female connector couplings 381 prior to coupling with the male connector couplings 321 on the modular back wall panel frame member 320. FIG. 4C illustrates an enlarge view of the panel-to-panel connector couplings 401 of the modular side wall panel frame member 380 and its female connector couplings 381 coupled with the male connector couplings 321 on the modular back wall panel frame member 320.

Figure 4D:
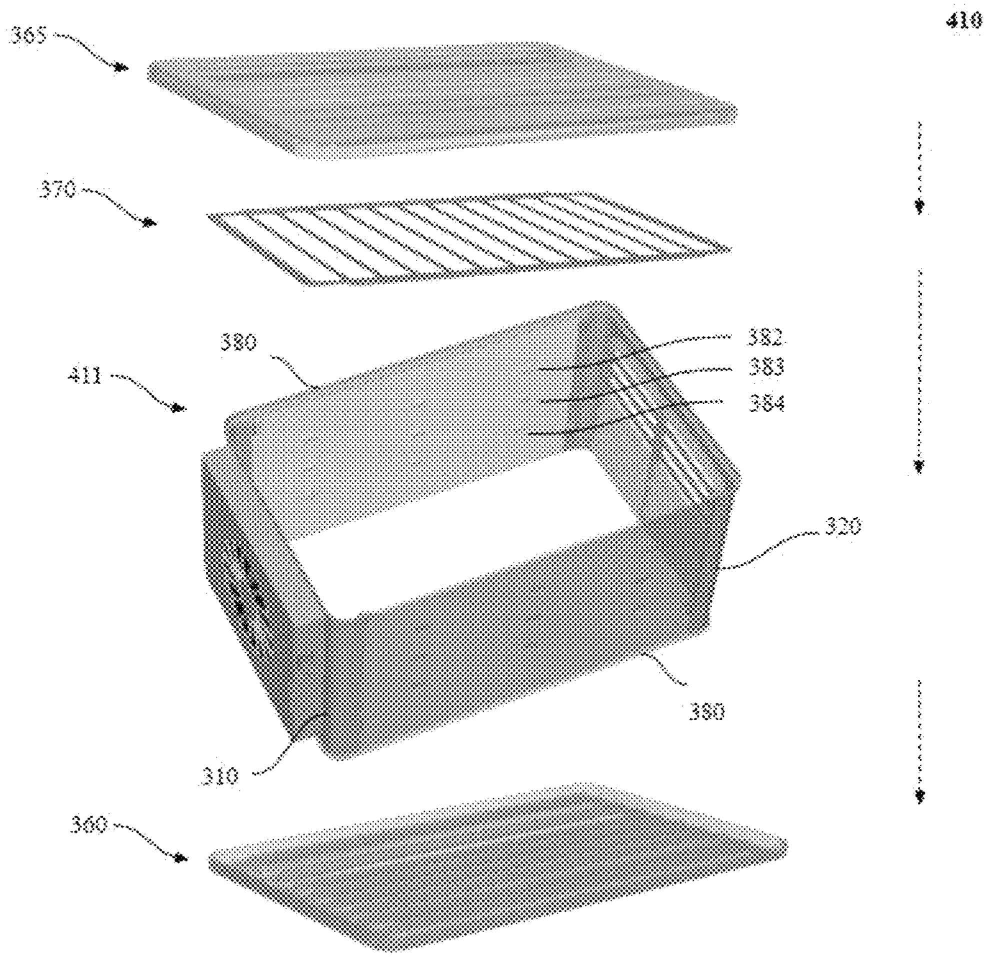
FIG. 4D is the exploded perspective view of the order of assembly of an embodiment of the modular and configurable powered-fan food drying apparatus FIG. 1A.

The complete order of assembly of all the modular components frame members of an embodiment of the modular and configurable powered-fan food drying apparatus in FIG. 1A is illustrated at 410 in FIG. 4D. The two modular side wall panel frame members 380 are coupled to the modular front wall panel frame member 310 and to the modular back wall panel frame member 320, respectively to formed a fully assembled box wall apparatus frame member 411. Then box wall apparatus frame member 411 is positioned thereon to the top of the modular bottom base panel frame member 360. Next is to position the configurable food drying rack grill frame member 370 thereon to one of the side wall ledge support levels 382, 383 or 384. In the FIG. 1A example, the side wall ledge support level 383 was selected. Lastly, the modular top cover panel frame member 365 in positioned thereon to the top of the box wall apparatus frame member 411 to complete an embodiment of the modular and configurable powered-fan food drying apparatus 110 as illustrated in FIG. 1A.

Figure 5A:
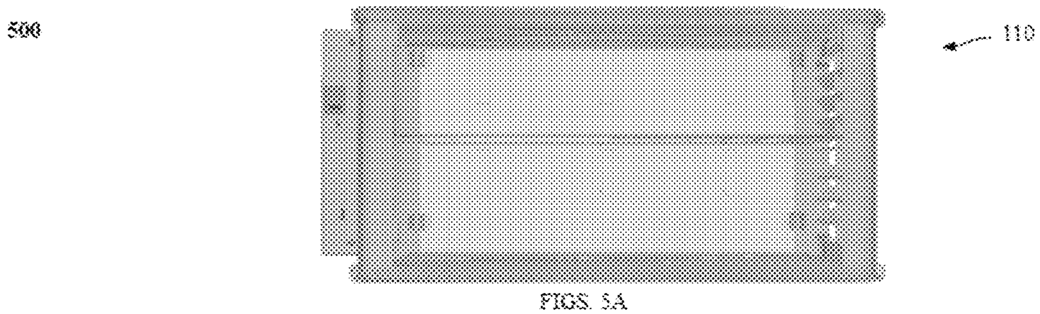
FIG. 5A is the side elevation view of the modular and configurable powered-fan food drying apparatus FIG. 1A.
Figure 5B:
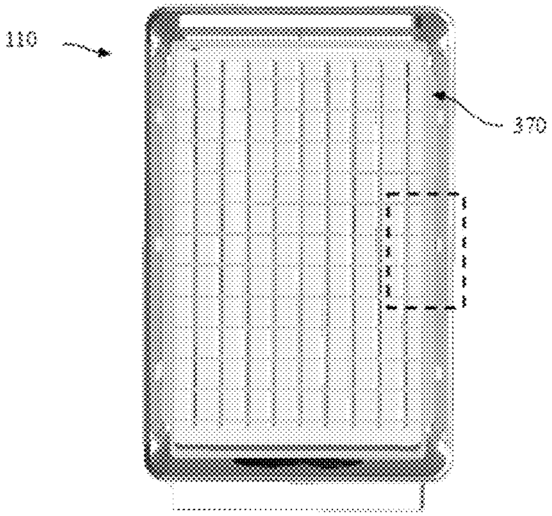
FIG. 5B is the top elevation view of FIG. 5A.
Figure 5C:
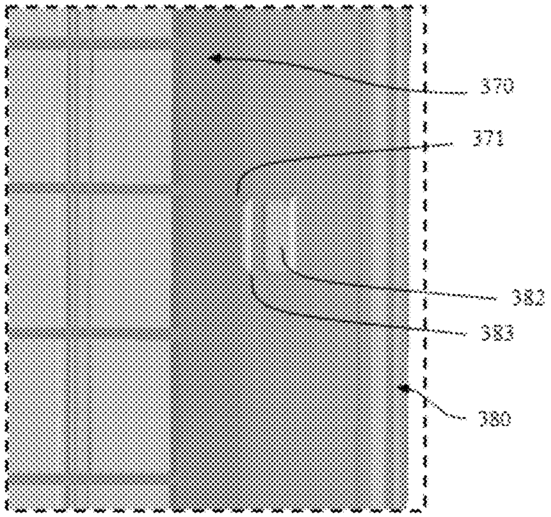
FIG. 5C is the enlarged top elevation view of FIG. 5B.

At 500 in FIG. 5A illustrates the completed assembly of the modular components frame members as described at 410 in FIG. 4D above into an embodiment of an modular and configurable powered-fan food drying apparatus 110. FIG. 5B illustrates the top view of the configurable food drying rack grill frame member 370 positioned in the modular and configurable powered-fan food drying apparatus 110. FIG. 5C is an enlarge view of FIG. 5B illustrating the configurable food drying rack grill frame member 370 with its reinforced wide side edge 371 positioned against the modular side wall panel frame member 380. The reinforced wide side edge 371 is positioned and supported on side wall ledge support 383 below the first side wall ledge support 382.

Figure 5D:
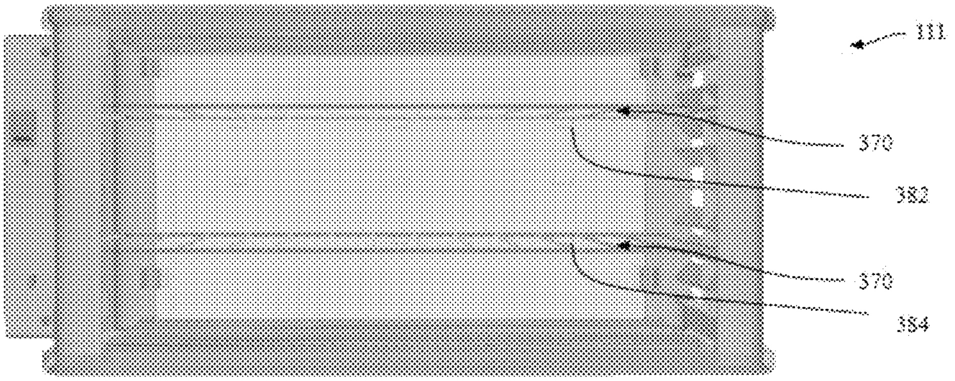
FIG. 5D is the side elevation view of the modular and configurable powered-fan food drying apparatus FIG. 1B.
Figure 5E:
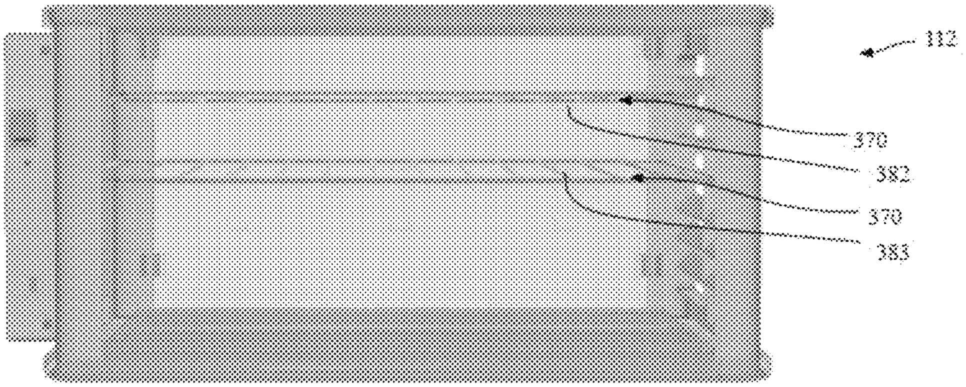
FIG. 5E is the side elevation view of the modular and configurable powered-fan food drying apparatus of the invention with an alternative configuration of the two configurable food drying racks frame members FIG. 3E.

At 550 in FIG. 5D is an alternative configuration of an embodiment of the invention of the powered-fan food drying apparatus 111 in FIG. 1B illustrating the two configurable food drying rack grill frame member 370 positioned on the side wall ledge support 382 and 384, respectively. FIG. 5E illustrates another alternative configuration of an embodiment of the invention of the powered-fan food drying apparatus 112 illustrating the two configurable food drying rack grill frame members 370 positioned on the side wall ledge support 382 and 383, respectively.

Figure 6A:
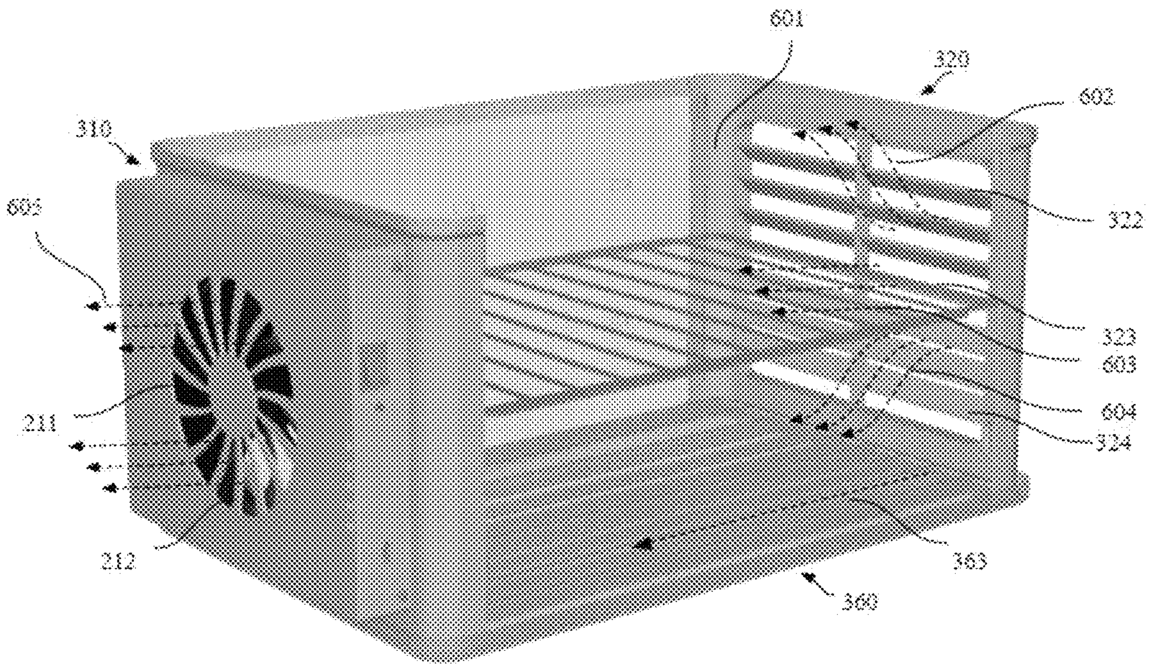
FIG. 6A is an exposed perspective view of FIG. 1A configured with one configurable food drying rack FIG. 3E.

The method for food items' skin and surface drying is illustrated in an exposed view at 600 in FIG. 6A when using an embodiment of the invention of an modular and configurable powered-fan food drying apparatus 110 in FIG. 1A.

First, when powered-on, the assembled powered-fan modular front wall panel frame member's 310 powered-fan 211 expels outwards air flow 605 through the housing-cover grill 212. This in turn draws air flow through the modular back wall panel frame member 320 and into the food drying apparatus cavity 601. Second, the direction of air flowing into the cavity is guided by upward tilt deflector slats 322 directing air flow upwards 602. flat deflector slat 323 maintains horizontal level air flow 603. Downward tilt slats 324 direct air flow downwards 604 which continues flowing along the modular bottom base panel frame member's 360 directional channelled air flow 363. Third, all air flow inside the food drying apparatus cavity 601 continues moving forward from the modular back wall panel frame member 320 toward the assembled powered-fan modular front wall panel frame member 310. Finally, the outwards air flow 605 is expelled through the housing-cover grill 212. This movement of air flow continues until powered-fan 211 is turned off.

Figure 6B:
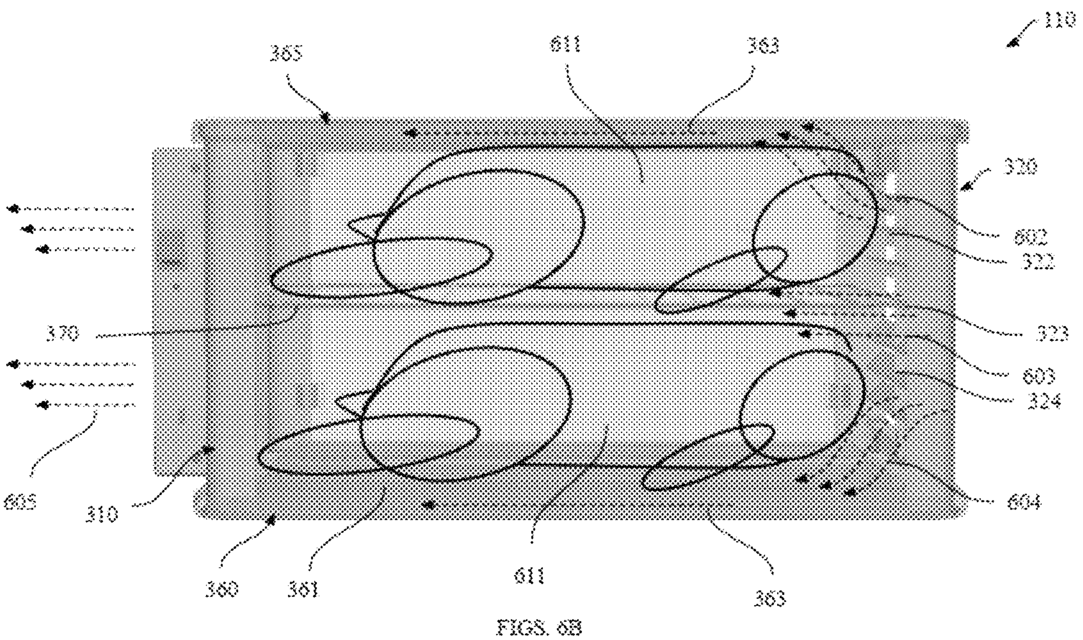
FIG. 6B is the side elevation view of the modular and configurable powered-fan food drying apparatus FIG. 1A drying two poultry meat food items.

At 610 in FIG. 6B illustrates an example of various food items' skin and surface drying method using an embodiment of the invention of the modular and configurable powered-fan food drying apparatus 110 configured with one configurable food drying rack grill frame member 370. There are two whole poultry 611 food items for skin drying. The top poultry is positioned on the configurable food drying rack grill frame member 370. Where as the bottom poultry is positioned on top the lateral parallel air flow channel walls frame members 361.

When powered-fan is turned on, air flow enters the modular back wall panel frame member 320. Air flow is guided by upward tilt deflector slats 322 directing air flow upwards 602 flowing over the top of the top poultry and continues along the modular top cover panel frame member's 365 directional channelled air flow 363. The flat deflector slat 323 maintains horizontal level air flow 603; air flowing underneath of the top poultry and over top of the bottom poultry. Downward tilt slats 324 direct air flow downwards 604 underneath the bottom poultry along the modular bottom base panel frame member's 360 directional channelled air flow 363. The air flow envelops all the food item's surface as it continues flowing toward the assembled powered-fan modular front wall panel frame member 310 and gets expelled outwards air flow 605. This method of food item's skin and surface drying accelerates the drying time in a safe and efficient process.

Figure 6C:
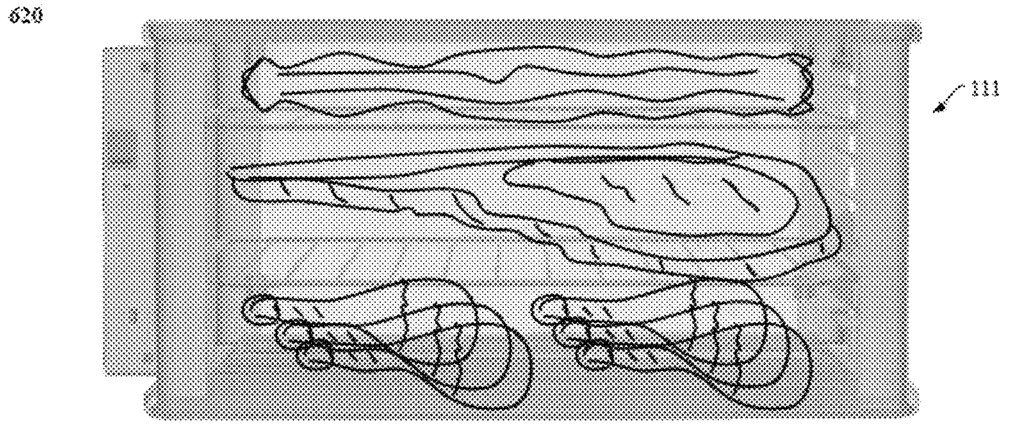
FIG. 6C is the side elevation view of the modular and configurable powered-fan food drying apparatus FIG. 1B drying variety of meat food items.
Figure 6D:
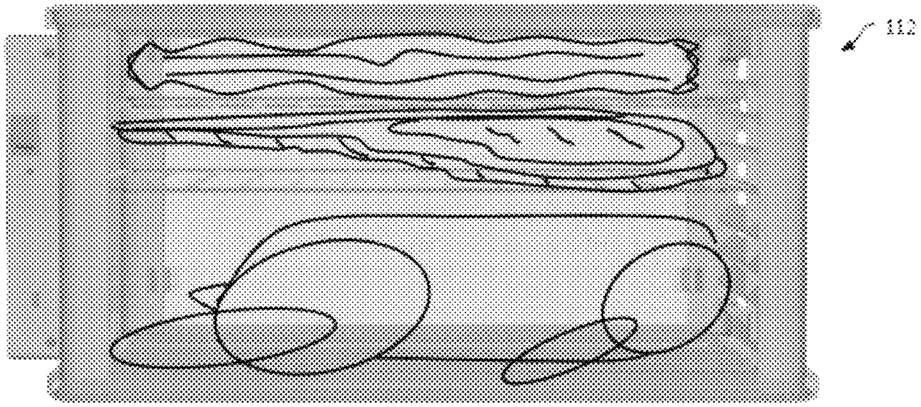
FIG. 6D is the side elevation view of FIG. 5E drying a poultry and variety of meat food items.

At 620 in FIGS. 6C and 6D illustrate alternative configurations of an embodiment of the invention of the powered-fan food drying apparatus 111 and 112 each configured with two configurable food drying rack grill frame member 370. Therefore, each food drying apparatus configuration would accommodate a different variety of food items.

What is claimed:

1. An apparatus for drying a food item, comprising:

a modular enclosed box configured to be positioned in a refrigerator cooling device, wherein the modular enclosed box defines a cavity and comprises six modular panel frame members including a modular front wall panel frame member, a modular back wall panel frame member, two modular side wall panel frame members, a modular bottom base panel frame member, and a modular top cover panel frame member, wherein the modular back wall panel frame member comprises air flow deflector slats and back panel-to-panel male connector couplings, wherein the deflector slats are configured to guide and evenly distribute the air flow into the cavity; and a configurable food drying rack grill frame member adapted to support the food item, wherein the configurable food drying rack grill frame member is height adjustable to accommodate various food item sizes.

2. The apparatus of claim 1, wherein the modular front wall panel frame member comprises a powered fan and front panel-to-panel male connector couplings.

3. The apparatus of claim 2 wherein the powered fan, when powered-on, expels air from the cavity and draws fresh air through the modular back wall panel frame member into the cavity.

4. The apparatus of claim 2, wherein each of the two modular side wall panel frame members comprises front panel-to-panel female connector couplings that are coupled with the front panel-to-panel male connector couplings of the modular front wall panel frame member to form a front end of the modular enclosed box.

5. The apparatus of claim 1, wherein each of the two modular side wall panel frame members comprises back panel-to-panel female connector couplings that are coupled with the back panel-to-panel male connector couplings of the modular back wall panel frame member to form a back end of the modular enclosed box.

6. The apparatus of claim 1, wherein each of the two modular side wall panel frame members comprises a plurality of levels of identical wall ledges that are removably engaged by the configurable food drying rack grill frame member so as to support the food item.

7. The apparatus of claim 6, wherein a height position of the configurable food drying rack grill frame member is adjusted based on which of the plurality of levels of identical wall ledges the configurable food drying rack grill frame member is positioned on.

8. The apparatus of claim 1, wherein the modular bottom base panel frame member is adapted for use as the modular top cover panel frame member in an upside-down orientation.

9. The apparatus of claim 1, wherein the modular bottom base panel frame member comprises a plurality of lateral, parallel airflow-channel walls configured to support the food item and channel airflow underneath the food item.

10. A method for drying a food item using an apparatus, comprising:

positioning the food item within a cavity defined by a modular enclosed box of the apparatus, wherein the food item is supported by at least one of a configurable food drying rack grill frame member and a plurality of lateral, parallel airflow-channel walls of a modular bottom base panel frame member;

powering on a powered fan associated with a modular front wall panel frame member of the modular enclosed box to expel air outward from the cavity and thereby draw air through a modular back wall panel frame member into the cavity;

directing, by airflow-deflector slats of the modular back wall panel frame member, the air upwardly, horizontally, and downwardly into the cavity;

flowing the air from the modular back wall panel frame member toward the modular front wall panel frame member, over, under, and around the food item to evaporate moisture from a skin and an exterior surface of the food item; and maintaining the powered fan in a powered-on state to maintain airflow into and out of the cavity.

* * * * *